United States Patent
Morgan et al.

[15] 3,660,197

[45] Feb. 2, 1972

[54] METHOD OF MAKING A WARP SHEET COMPRISING CARBON FILAMENTS

[72] Inventors: Peter E. Morgan, Styvechale, Coventry; Ronald William Roberts, Camp Hill, Nuneaton, both of England

[73] Assignee: Courtaulds Limited, London, England

[22] Filed: Feb. 28, 1969

[21] Appl. No.: 803,451

[30] Foreign Application Priority Data

Feb. 29, 1968 Great Britain..................9,789/68

[52] U.S. Cl..............156/280, 156/178, 156/300, 156/301, 161/170, 117/26
[51] Int. Cl.....................................B32b 31/00
[58] Field of Search..........156/330, 178, 280, 297, 298, 156/300, 301; 117/26; 161/170

[56] References Cited

UNITED STATES PATENTS

| 2,758,630 | 8/1956 | Hodge | 156/178 x |
| 3,156,027 | 11/1964 | Wellman | 156/178 x |

Primary Examiner—Carl D. Quarforth
Assistant Examiner—Stephen J. Lechert, Jr.
Attorney—Davis, Hoxie, Faithfull & Hapgood

[57] ABSTRACT

A process for the production of a warp sheet which comprises preparing a sheet of an inert material and coating that sheet with a polymeric material which can be rendered tacky, causing a number of oriented carbon filaments to adhere to the tacky coating, covering the exposed surface of the carbon filaments with polymeric material, and treating the polymeric material to reduce the degree of tack. Thin warp sheets may be prepared by applying a relatively thick layer of carbon filaments and removing those which do not adhere while thicker sheets are made by spreading the requisite quantity of carbon filaments uniformly over the surface.

9 Claims, No Drawings

METHOD OF MAKING A WARP SHEET COMPRISING CARBON FILAMENTS

This invention relates to the production of composite materials and in particular to the production of composite sheet material comprising carbon filaments set in a unidirectional manner in or on a backing sheet. Such composite materials referred to hereinafter as "warp-sheets" are useful in the production of laminates which comprise carbon filaments in a matrix of polymeric material.

Carbon filaments are produced by heating organic polymeric material in filamentary form under specific conditions of tension, temperature, time and surrounding atmosphere. Suitable materials are those of cellulosic origin, polyamides, polyesters or preferably fibers consisting of polyacrylonitrile or copolymers of acrylonitrile with other monomers.

According to the invention a process for the production of a warp sheet comprises preparing a film or sheet of an inert material coating the film or sheet with a polymeric material which is or can be rendered tacky, causing a layer of oriented carbon filaments to adhere to the coating while tacky, and covering the exposed surface of the carbon filaments with polymeric material. If necessary, the polymeric material may be treated after the layer of carbon filaments has been applied to reduce the degree of tack.

In the process of the invention a film or sheet of inert material, which may for example be a polyester or cellulose film or sheet, is coated with a synthetic resin or resin precursor in a film in which it is or can be rendered tacky. The coating should be applied uniformly and to a controlled thickness. If desired the coating material may be diluted with a solvent during this application, which solvent is subsequently removed by evaporation. Suitable coating materials include for example an epoxy novolak resin with a boron trifluoride amine complex hardener such as that sold by Ciba Limited under the reference number LZ558/HT973. With some polymeric material coating systems it may be necessary to cure the polymeric material partially to impart the required degree of tack.

The film or sheet treated in the manner referred to above has applied to it a layer of carbon filaments arranged in a substantially unidirectional manner. This may be done for thin sheet material, for example, by covering the tacky surface with a layer of oriented carbon filaments and applying pressure so that those nearest to the tacky surface will adhere. The remainder of the filaments may then be pulled away leaving a closely spaced layer held by the tacky surface. The weight of carbon filaments per unit area of the tacky surface is a measure of the maximum ultimate carbon filament content of the warp sheet produced.

If thicker sheet material is required, for example sheets of 0.1 mm thickness, the requisite quantity of carbon filaments may be applied and spread uniformly over the tacky surface. No filaments need to be removed in this method.

The exposed surfaces of the adherent carbon filaments are covered with polymeric material, for example by the application of a volatile solvent for the polymeric material providing the tacky surface, preferably in the form of a mist, or by the application of a solution of a polymeric material (preferably the polymeric material providing the tacky surface) in a solvent. After covering the exposed surfaces of the carbon filaments with polymeric material, the warp sheet with its attached inert film or sheet consists of a layer of unidirectional carbon filaments incorporated within a sheet of one or more polymeric materials. If necessary the polymeric material or materials may be treated to reduce its tackiness for example by further curing, although the thicker sheets can normally be handled without difficulty, without further curing. When the further curing is required, the epoxy novolak type of resin referred to above may, for example be heated for about 20 minutes at 80°C. The inert backing film or sheet may be removed immediately or may be left in position to facilitate packing and transit.

When it is desired to produce a laminate a number of warp sheets produced by the process of the invention may be laid one on top of the other in the desired orientation and compacted under pressure and elevated temperature conditions to produce a fully cured carbon filament laminate.

EXAMPLES 1 – 4

In each of the following Examples a polyester backing layer was coated with a layer of epoxy novolak resin LZ558/HT973 forming a base assembly having a tacky surface. A tow of carbon filaments was laid on the tacky surface; thereby causing a layer of unidirectionally oriented carbon filaments to adhere to the tacky surface, and the unadhered carbon filaments were removed. Thereafter a mist of acetone was applied to the filament-coated tacky surface and the assembly allowed to dry. The acetone dissolves the epoxy novolak resin at the surface and, as the acetone evaporates away during the drying, deposits the resin around and over the exposed surfaces of the carbon filaments. When the assembly was dry the backing layer was removed and a laminate was built up by laying thus-formed warp sheets one on top of the other in the desired relative orientation and compacting them under pressure and at elevated temperature. The thickness and weight per unit area of the resin layer applied initially the maximum carbon filament content of a warp sheet and the thickness of a warp sheet after compaction are given in the following Table.

| Example | Resin Layer Wt. per unit area gm/m² | Thickness mm | Warp Sheet Maximum Carbon Filament Content % w/w | Thickness of Sheet After Compaction mm |
|---|---|---|---|---|
| 1 | 56 | 0.047 | 47 | 0.071 |
| 2 | 32 | 0.027 | 55 | 0.048 |
| 3 | 19 | 0.016 | 63 | 0.033 |
| 4 | 9 | 0.007 | 72 | 0.018 |

It is apparent from the Table that the thickness of each warp sheet after compaction is dependent on the weight ratio of carbon filament to resin.

What is claimed is:

1. A process for the production of a warp sheet which comprises coating a backing sheet with a tacky coating of a tackifiable resinous material, pressing a layer of oriented carbon filaments upon said tacky coating to adhere said layer to said coating leaving a surface of said filaments exposed, covering said exposed surface with tackifiable resinous material and at least partially curing said resinous material to reduce its tackiness.

2. The process as claimed in claim 1 in which the sheet is made from a material selected from polyester and cellulosic material.

3. The process as claimed in claim 1 in which the resinous coating material is an epoxy novolak resin.

4. The process as claimed in claim 1 in which the resinous coating material is diluted with a solvent before being applied to the backing sheet.

5. The process as claimed in claim 1 in which a layer of carbon filaments is applied to the tacky coating with the filaments lying in a substantially unidirectional manner and any unadherent filaments are subsequently removed.

6. The process as claimed in claim 1 in which the exposed surfaces of the adherent carbon filaments are covered with resinous material by the application to the assembly of filaments of a solvent for the resinous material providing the tacky coating.

7. The process as claimed in claim 1, in which the solvent for the resinous material is applied in the form of a mist.

8. The process as claimed in claim 1 in which the exposed surfaces of adherent carbon filaments are covered with resinous material by the application thereto of a solution of the polymeric material.

9. The process as claimed in claim 1 in which the resinous material is an epoxy novolak resin and is partially cured after formation of the warp sheet by heating it at about 80°C for not more than 20 minutes.

* * * * *

PO-1050
(5/69)

UNITED STATES PATENT OFFICE
CERTIFICATE OF CORRECTION

Patent No. 3,660,197          Dated May 2, 1972

Inventor(s) Peter E. Morgan and Ronald William Roberts

It is certified that error appears in the above-identified patent and that said Letters Patent are hereby corrected as shown below:

Page 1, top right, "Feb." should be -- May -- ([45]);

Column 2, line 25, insert a comma (,) after "initially";

Column 2, line 53, Claim 2, insert -- backing -- before "sheet".

Signed and sealed this 5th day of September 1972.

(SEAL)
Attest:

EDWARD M. FLETCHER, JR.          ROBERT GOTTSCHALK
Attesting Officer                Commissioner of Patents